United States Patent [19]

Ooba et al.

[11] 4,162,840
[45] Jul. 31, 1979

[54] FOCAL PLANE SHUTTER

[75] Inventors: Osamu Ooba, Abiko; Katsumi Kaneko, Ageo; Nobuyoshi Inoue, Kawagoe; Toshihisa Saito, Tokyo, all of Japan

[73] Assignee: Copal Company Limited, Tokyo, Japan

[21] Appl. No.: 888,384

[22] Filed: Mar. 20, 1978

[30] Foreign Application Priority Data

Mar. 24, 1977 [JP] Japan ................................. 52-32425

[51] Int. Cl.² .............................................. G03B 9/40
[52] U.S. Cl. .................................................... 354/246
[58] Field of Search .............................. 354/245–249, 354/253

[56] References Cited
U.S. PATENT DOCUMENTS 4,081,810  3/1978  Onda et al. ........................... 354/246

Primary Examiner—John Gonzales
Attorney, Agent, or Firm—Cushman, Darby & Cushman

[57] ABSTRACT

A focal plane shutter comprising a pair of upper arms rotatably supported on a shutter base plate and arranged with a spacing between them, a pair of lower arms overlapped respectively on said pair of upper arms with a spacing, three main shutter blades respectively supported by said upper arms so as to have overlapped portions even when developed between the respective pairs of upper arms and lower arms, and two auxiliary shutter blades respectively supported by the lower arms so as to overlap on the above mentioned overlapped portions when developed between the respective pairs of the upper arms and lower arms, in order to make the entire shutter device or particularly the dimensions in the vertical direction smaller. Tail portions are formed respectively at the free ends of the main shutter in the middle and the auxiliary shutter blades.

3 Claims, 3 Drawing Figures

FOCAL PLANE SHUTTER

BACKGROUND OF THE INVENTION (a) Field of the Invention:

The present invention relates to a focal plane shutter made to open and close an exposure aperture by operating a plurality of blades made of opaque laminar materials.

(b) Description of the prior art:

In this type of focal plane shutter, a plurality of laminar blades operatively connected with one or two arms are usually so arranged as to be housed as overlapped when retreating from an exposure aperture and to develop to close the exposure aperture as slightly overlapped with adjacent blades when covering the aperture and two blade groups each having a plurality of such blades as a set are provided, one of the groups is used to open the shutter and the other is used to close it.

It is needless to say that, in this type of focal plane shutter, in case one blade group covers the exposure aperture as mentioned above, the amount of the overlap of the adjacent blades with each other is desirable to be larger for the reason of preventing a light leakage. However, in order to thus increase the overlap between the respective blades, the width of each blade itself must be necessarily made larger. If the width of each blade is made larger, the area occupied by one blade group when it is housed or folded will become so large that it will be difficult to make the shutter device smaller and, as a result, it will be impossible to equip a small camera with this kind of focal plane shutter. In other words, in order to make this kind of focal plane shutter smaller, the width of each blade can not help being made smaller but, if it is made so, the amount of the overlap with each blade when the blade group is developed will become smaller and, as a result, the light will be likely to leak.

SUMMARY OF THE INVENTION

An object of the present invention is to provide a focal plane shutter of the above mentioned type formed so that, though narrow blades are used, a light leakage may be effectively prevented.

According to the present invention, this object is attained by providing on a base plate having an exposure aperture a pair of lower arms rotatably supported coaxially respectively with a pair of upper arms and capable of moving integrally with said pair of upper arms on a base plate on which an exposure aperture is formed and supporting on said pair of lower arms auxiliary shutter blades made of a plurality of opaque laminae which cover the respectively reduced overlapping zones of main shutter blades when the main shutter blades close the exposure aperture and which overlap in conformity with the main shutter blades when the main shutter blades open the exposure aperture.

The others of the plurality of opaque laminae forming the main shutter blades than the uppermost one and/or the others of the plurality of laminae forming the auxiliary shutter blades than the uppermost one are provided with respective tails having edges crossing the edge of the exposure aperture.

This and other objects of the present invention will become more apparent during the course of the following detailed description and appended claims.

DESCRIPTION OF THE PREFERRED EMBODIMENT

Figure 1:
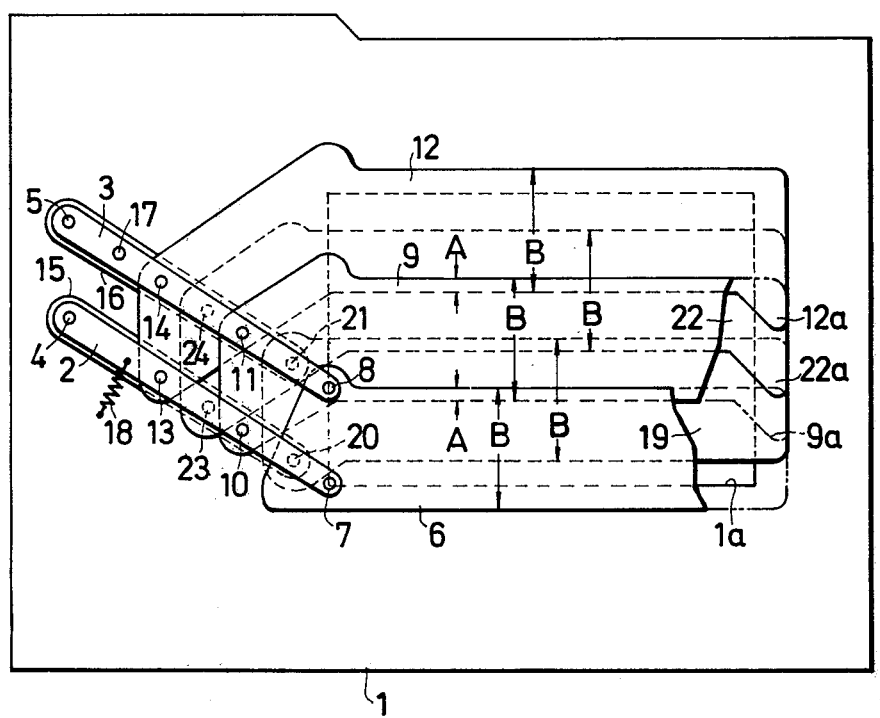
FIG. 1 is an elevational view of a focal plane shutter according to the present invention in which a shutter blade group is developed to cover an exposure aperture.
Figure 2:
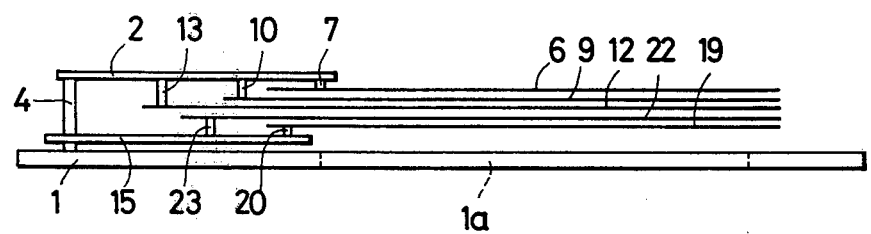
FIG. 2 is a lower side view of FIG. 1.
Figure 3:
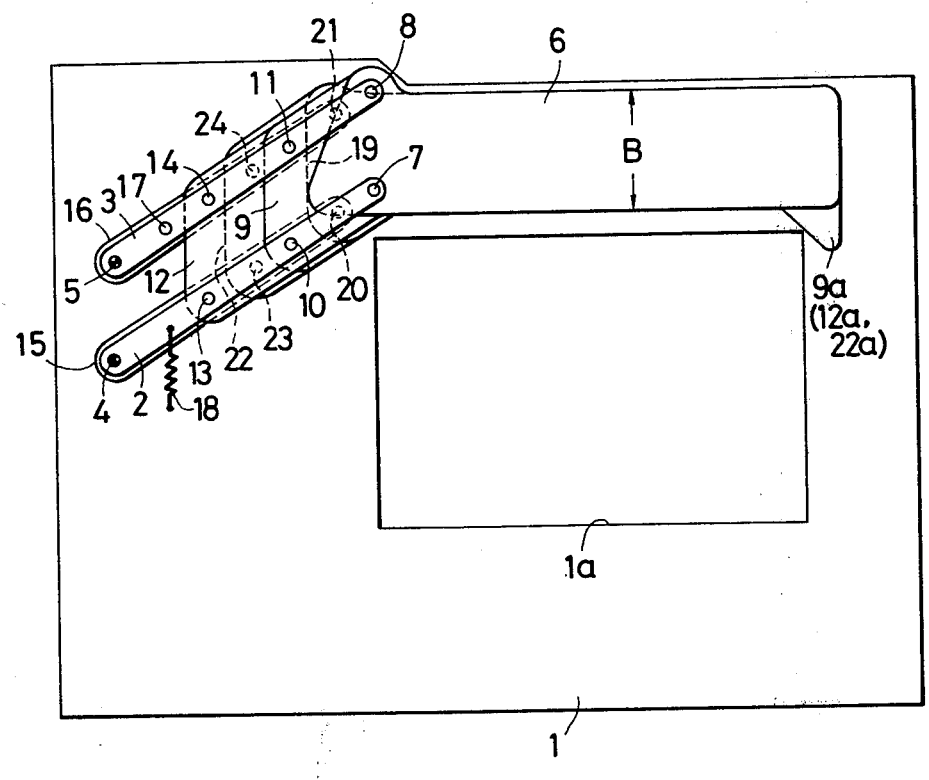
FIG. 3 is an elevational view showing the shutter blade group shown in FIG. 1 as folded to open the exposure aperture.

In FIGS. 1 to 3, reference numeral 1 indicates a shutter base plate provided with an exposure aperture 1a, 2 and 3 indicate a pair of arms pivoted to this shutter base plate 1, 6 indicates an opaque lamina for forming an exposure slit pivoted to the upper arms 2 and 3 respectively through shafts 7 and 8, 9 indicates an opaque lamina pivoted to the upper arms 2 and 3 respectively through shafts 10 and 11 and having a tail 9a, 12 indicates an opaque lamina pivoted to the upper arms 2 and 3 respectively through shafts 13 and 14 and having a tail 12a, 15 and 16 indicate lower arms pivoted to the shutter base plate 1 respectively through shafts 4 and 5, 17 indicates a pin for connecting the upper arm 3 with the lower arm 16, 18 indicates a spring clockwise biasing the upper arm 2, 19 indicates an opaque lamina pivoted to the lower arms 15 and 16 respectively through shafts 20 and 21, 22 indicates an opaque lamina having a tail 22a and pivoted to the lower arms 15 and 16 respectively through shafts 27 and 24, A indicates an overlapping width of each of the opaque laminae 6, 9 and 12, and B indicate a width of each of the opaque laminae 6, 9 and 12.

The opaque laminae 6, 9 and 12 form respective main shutter blades, and the opaque laminae 19 and 22 form respective auxiliary shutter blades. A rear blade group is formed of these main shutter blades and auxiliary shutter blades. In fact, a front blade group formed the same as this rear blade group and arranged in a mirror image relation with said rear blade group on the shutter base plate is provided. But this front blade group is omitted for brevity. Further, the shutter cocking and releasing mechanisms are not directly necessary for the understanding of the present invention and are therefore also omitted in the illustration. The tails 9a, 12a and 22a have respective edges crossing the right side edge of the exposure aperture 1a as illustrated.

The operation shall be explained in the following.

FIG. 1 shows the exposing operation of the shutter as completed. In this state, the exposure aperture 1a is closed by the main shutter blades 6, 9 and 12. Then the opaque laminae 6, 9 and 12 are developed to cover the exposure aperture 1a but their overlapping width A is so small that they are overlapped deeply by only the portions pivoted by the upper arms 2 and 3 and the tails 9a and 12a provided in the end portions on the sides opposed to them so that the biting of the laminae with each other by the shock at the time of the operation, that is, the crossing of the end edges in the overlapping zones of the respective laminae may be prevented. In such case, the overlapping width A will be so small that the light interception will not be sufficient and the possibility of causing a light leakage through between the respective laminae will be very high. However, by the opaque laminae 19 and 22 pivoted to the lower arms 15 and 16 formed so as to be able to operate integrally with the upper arms 2 and 3 through the shafts 4 and 5 and pin 17 and capable of sufficiently covering the zone of this overlapping width A, the zone will be positively shielded from the light and therefore there will be no possibility of the light leakage at all. The width B of each of these opaque laminae 19 and 22 is equal to the width of each of those opaque laminae 6, 9 and 12. In this case, as said laminae are likely to bite each other, the tails 22a are formed to prevent such biting.

When the upper arms 2 and 3 is rotated counterclockwise from the state of the completion of the operation shown in FIG. 1, the lower arms 15 and 16 will be also rotated counterclockwise to cock the shutter, a state before the shutter release is made, that is, an operation awaiting state will be made and the rear blade group will be in the state shown in FIG. 3. In such case, in fact, the front blade group of the same arrangement not illustrated will be in the same state as of the rear blade group and therefore the exposure aperture 1a will not be opened. In this state, the opaque laminae 19 and 22 will perfectly overlap with the opaque laminae 6, 9 and 12 and the main shutter blades and auxiliary shutter blades will be thereby able to be housed within the space of the width B.

The above illustrated embodiment is shown of a type of focal plane shutter provided with two sets of shutter blades each holding a plurality of opaque laminae with upper and lower arms wherein the blades are operated while kept parallel by respective pantograph mechanisms. However, the present invention is not limited to this type but can be applied to any type of focal plane shutter wherein, even if a part or all of the blades do not operate parallelly, when the exposure aperture is opened, the blades will be overlapped with each other and, when the exposure aperture is closed, the overlapping will be reduced and the blades will develop. Further, the auxiliary shutter blades of the present invention may be for either or both of the front blade group and rear blade group.

As described above, according to the present invention, the widths of the opaque laminae forming the front blade group and rear blade group can be all made smaller and, as a result, the space occupied by the shutter blades as housed, that is, folded can be made so small as to be very effective to compact the entire shutter, further a light leakage from the overlapping zones of the respective laminae can be perfectly prevented and, even in case a high sensitivity film is used, a favorable photographing will be able to be made.

We claim:

1. A focal plane shutter comprising a base plate having an exposure aperture formed thereon, a pair of upper arms rotatably supported on said base plate, main shutter blades made of a plurality of opaque laminae supported on said pair of upper arms to open and close said exposure aperture and increasing the area of the overlap with each other in the course of opening said exposure aperture by the movement of said pair of upper arms and reducing the area of the overlap with each other in the course of closing said exposure aperture by the movement of said pair of upper arms, a pair of lower arms rotatably supported coaxially respectively with said pair of upper arms on said base plate and capable of moving integrally with said pair of upper arms, and auxiliary shutter blades made of a plurality of opaque lamina supported on said pair of lower arms and covering the respective reduced overlapping zones of said main shutter blades when said main shutter blades close said exposure aparture and overlapping in conformity with main shutter blades when said main shutter blades open said exposure aperture.

2. A focal plane shutter according to claim 1 wherein the others of said plurality of opaque laminae forming said main shutter blades than the uppermost one are respectively provided with a tail portion having an edge crossing the edge of said exposure aperture.

3. A focal plane shutter according to claim 1 wherein the others of said plurality of opaque laminae forming said auxiliary shutter blades than the lowermost one are respectively provided with a tail portion having an edge crossing the edge of said exposure aperture.

* * * * *